(12) United States Patent
Balijepalli et al.

(10) Patent No.: US 8,652,568 B2
(45) Date of Patent: Feb. 18, 2014

(54) COATING COMPOSITION

(75) Inventors: Sudhakar Balijepalli, Midland, MI (US); Ray E. Drumright, Midland, MI (US); Sarah T. Eckersley, Midland, MI (US); Brad E. Elwood, Fort Wayne, IN (US); Paul Foley, Midland, MI (US); Yanziang Li, Midland, MI (US); Kumar Nanjundiah, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 138 days.

(21) Appl. No.: 13/227,122

(22) Filed: Sep. 7, 2011

(65) Prior Publication Data

US 2012/0059107 A1 Mar. 8, 2012

Related U.S. Application Data

(60) Provisional application No. 61/380,624, filed on Sep. 7, 2010.

(51) Int. Cl.
| | | |
|---|---|---|
| B05D 3/00 | (2006.01) | |
| B05D 3/02 | (2006.01) | |
| B32B 27/00 | (2006.01) | |
| B32B 27/40 | (2006.01) | |
| B32B 43/00 | (2006.01) | |
| C08G 18/00 | (2006.01) | |
| C08G 18/08 | (2006.01) | |
| C08G 18/28 | (2006.01) | |
| C08J 3/00 | (2006.01) | |
| C08K 3/20 | (2006.01) | |
| C08L 75/00 | (2006.01) | |
| C08L 91/00 | (2006.01) | |

(52) U.S. Cl.
USPC ............ 427/140; 427/372.2; 427/385.5; 428/423.1; 524/589; 524/590; 528/44; 528/74.5; 528/80; 528/81; 528/85

(58) Field of Classification Search
USPC ......... 524/589, 590; 528/44, 74.5, 80, 81, 85; 427/140, 372.2, 385.5; 428/423.1
See application file for complete search history.

(56) References Cited

U.S. PATENT DOCUMENTS

| 4,672,001 A | 6/1987 | Bravet et al. |
|---|---|---|
| 5,030,686 A | 7/1991 | Holzer et al. |
| 6,423,816 B1 | 7/2002 | Wamprecht et al. |
| 7,060,140 B2 | 6/2006 | Cheng et al. |
| 7,091,297 B2 | 8/2006 | Mather et al. |
| 7,199,464 B2 | 4/2007 | Luo et al. |
| 2002/0161161 A1 | 10/2002 | Heidbreder et al. |
| 2003/0191274 A1 | 10/2003 | Kurth et al. |
| 2009/0062453 A1 | 3/2009 | Foringer et al. |
| 2009/0098299 A1 | 4/2009 | Cheng |
| 2010/0178502 A1 | 7/2010 | Spilman et al. |

FOREIGN PATENT DOCUMENTS

| EP | 0202960 A1 | 11/1986 |
|---|---|---|
| EP | 0784641 B1 | 1/2002 |
| JP | 05086160 | 4/1993 |
| WO | 02088215 A2 | 11/2002 |
| WO | 2004096882 A1 | 11/2004 |
| WO | 2004096883 A1 | 11/2004 |
| WO | 2006087475 A1 | 8/2006 |
| WO | 2007046687 A1 | 4/2007 |
| WO | 2009065899 A1 | 5/2009 |
| WO | 2011124710 A1 | 10/2011 |

OTHER PUBLICATIONS

Mechtel et al., "Possibilities with High Functional Aliphatic Polyisocyanates," Bayer Material Science, European Coatings Conference Berlin, Feb. 2008, pp. 1-19.

*Primary Examiner* — Patrick Niland
(74) *Attorney, Agent, or Firm* — Andrew E. C. Merriam

(57) ABSTRACT

The instant invention is a coating system, a coating composition, a coating layer, a coated substrate, a method for producing a coating composition, a method for forming a coating layer, a method for making a coated substrate, and a method for healing a coated substrate. The coating system according to the present invention comprises (a) one or more natural oil derived polyols having an average of 3 or more hydroxyl groups per molecule, a number average molecular weight in the range of 300 to 3000 Daltons, a $T_g$ in the range of from less than 0° C.; and (b) one or more polyisocyanates.

4 Claims, 1 Drawing Sheet

COATING COMPOSITION

FIELD OF INVENTION

The instant invention relates to a coating system, a coating composition, a coating layer, a coated substrate, a method for producing a coating composition, a method for forming a coating layer, a method for making a coated substrate, and a method for healing a coated substrate.

BACKGROUND OF THE INVENTION

Coatings typically require acceptable level of clarity, for example in the case of clearcoat applications, hardness, impact resistance, environmental etch resistance, weatherbility, scratch and mar resistance, and adhesion to basecoats and/or other substrates.

Scratch and mar resistance and/or recovery are significantly important in coating markets for wood, plastic, and metal substrates. Such recovery or resistance to damage of surfaces is useful in preserving the aesthetics of surfaces in a number of finishes in applications, such as, automotive interior and exteriors, exterior of rail cars, consumer electronic goods, displays, sporting goods, leather goods, wood furniture, wood flooring, metal appliances, etc. Additionally, such a feature is useful for protecting surfaces when they are damaged from corrosion, e.g. protection of surfaces in light and medium duty equipments such as tractors, farm equipments, pipes, tanks in the oil, gas and chemical industries.

However, simultaneously satisfying environmental etch resistance and hardness with scratch and mar resistance has been a challenge for coating applications. For example, increasing cross-link density may result in increasing hardness and slows diffusion of small molecules through the coating. Thus, this may provide increased barrier to environmental agents like acid or solvents leading to improved environmental etch resistance of the coating. However, the coating may become brittle, and easily broken with scratching and marring of the surfaces; therefore, leading to unsightly damage. Solving this dichotomy has been a challenge for the industry.

Accordingly, there is still in need for a polyurethane coating composition with adequate hardness and scratch and mar resistance as well as self-healing properties.

SUMMARY OF THE INVENTION

The instant invention is a coating system, a coating composition, a coating layer, a coated substrate, a method for producing a coating composition, a method for forming a coating layer, a method for making a coated substrate, and a method for healing a coated substrate.

In one embodiment, the instant invention provides coating system comprising: (a) one or more natural oil derived polyols having an average of 3 or more hydroxyl groups per molecule, a number average molecular weight in the range of 300 to 3000 Daltons, a $T_g$ in the range of from less than 0° C.; and (b) one or more polyisocyanates.

In another embodiment, the instant invention further provides a coating composition comprising the reaction product of: (a) one or more natural oil derived polyols having an average of 3 or more hydroxyl groups per molecule, a number average molecular weight in the range of 300 to 3000 Daltons, a $T_g$ in the range of from less than 0° C.; and (b) one or more polyisocyanates.

In one embodiment, the instant invention further provides a coating layer comprising a film, wherein said film is derived from a coating composition comprising the reaction product of: (a) one or more natural oil derived polyols having an average of 3 or more hydroxyl groups per molecule, a number average molecular weight in the range of 300 to 3000 Daltons, a $T_g$ in the range of from less than 0° C.; and (b) one or more polyisocyanates.

In one embodiment, the instant invention further provides a coated substrate comprising: a substrate; and a coating layer associated with said substrate, wherein said coating layer comprises a film, wherein said film is derived from a coating composition comprising the reaction product of: (a) one or more natural oil derived polyols having an average of 3 or more hydroxyl groups per molecule, a number average molecular weight in the range of 300 to 3000 Daltons, a $T_g$ in the range of from less than 0° C.; (b) one or more polyisocyanates.

In one embodiment, the instant invention further provides a coating layer comprising a film, wherein said film is capable of self-healing at a temperature in the range of from 10 to 90° C.

In one embodiment, the instant invention further provides a method for producing a coating composition comprising the steps of: (1) selecting one or more natural oil derived polyols having an average of 3 or more hydroxyl groups per molecule, a number average molecular weight in the range of 300 to 3000, a $T_g$ in the range of from less than 0° C.; (2) selecting one or more polyisocyanates; (3) contacting said one or more natural oil derived polyols with said one or more polyisocyanates; (4) thereby producing said coating composition.

In one embodiment, the instant invention further provides a method for forming a coating layer comprising the steps of: (1) selecting a coating system comprising: (a) one or more natural oil derived polyols having an average of 3 or more hydroxyl groups per molecule, a number average molecular weight in the range of 300 to 3000, a $T_g$ in the range of from less than 0° C.; and (b) one or more polyisocyanates; (2) contacting said one or more natural oil derived polyols with said one or more polyisocyanates; and (3) thereby forming said coating layer.

In one embodiment, the instant invention further provides a method for making a coated substrate comprising the steps of: (1) selecting a substrate; (2) selecting a coating composition comprising the reaction product of: (a) one or more natural oil derived polyols having an average of 3 or more hydroxyl groups per molecule, a number average molecular weight in the range of 300 to 3000, a $T_g$ in the range of from less than 0° C.; (b) one or more polyisocyanates; (3) applying said coating composition to said substrate; (4) thereby forming a coating layer associated with said substrate; and (5) thereby forming said coated substrate.

In an alternative embodiment, the instant invention further provides a method for healing a coating layer comprising the steps of: (1) selecting a coating layer associated, wherein said coating layer comprises a film, wherein said film is derived from a coating composition comprising the reaction product of: (a) one or more natural oil derived polyols having an average of 3 or more hydroxyl groups per molecule, a number average molecular weight in the range of 300 to 3000, a $T_g$ in the range of from less than 0° C.; and (b) one or more polyisocyanates; (2) heat treating said coating layer at a temperature in the range of from 10 to 90° C.; and (3) thereby healing said coating layer.

In an alternative embodiment, the instant invention further provides a method for healing a coated substrate comprising the steps of: (1) selecting a coated substrate comprising: a substrate; and a coating layer associated with said substrate, wherein said coating layer comprises a film, wherein said film is derived from a coating composition comprising the reaction product of: (a) one or more natural oil derived polyols having an average of 3 or more hydroxyl groups per molecule, a number average molecular weight in the range of 300 to 3000, a $T_g$ in the range of from less than 0° C.; and (b) one or more polyisocyanates; (2) heat treating said coating layer at a temperature in the range of from 10 to 90° C.; and (3) thereby healing said coated substrate.

In an alternative embodiment, the instant invention provides a method for healing a coated substrate or a coating layer, in accordance with any of the preceding embodiments, except that the heat treatment step is achieved via hot water heat treatment or steam treatment.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has one or more terminal groups.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the terminal group is selected from the group consisting of aliphatic alkyl group, aliphatic polyester group, aliphatic acrylate group, siloxane groups, fluoro groups, fluoro ether groups, and combinations thereof.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating composition has one or more pendent groups.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the one or more grafting groups, for example one or more grafted polymeric siloxane groups, on to the backbone of said coating composition.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the one or more pendent groups are selected from the group consisting of aliphatic alkyl groups, aliphatic polyester groups, aliphatic acrylate groups, siloxane groups, fluoro groups, fluoro ether and combinations thereof.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the (a) component further comprises one or more polyester polyols, acrylic polyols, or carbonate polyols, and combinations thereof.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the one or more polyisocyanates have at least two reactive isocyanate groups.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating composition further comprises one or more solvents, water or combinations thereof.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating composition comprises from 30 to 90 percent by weight of solid content, based on the weight of the coating composition.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has an average of 3 to 9 hydroxyl groups per molecule.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has an average of 3 to 6 hydroxyl groups per molecule.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has an average of 3 to 5 hydroxyl groups per molecule.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has a Tg in the range of from 0° C. to −100° C.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has a Tg in the range of from 0° C. to −70° C.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has a Tg in the range of from −35° C. to −70° C.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has a number average molecular weight in the range of 300 to 3000 Daltons.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the polyol has a molecular weight in the range of 300 to 1500 Daltons.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating composition further comprises one or more additives, one or more fillers, one or more catalysts, one or more flow aid agents, one or more adhesion promoter agents, one or more pigments, one or more UV stabilizers, and combinations thereof.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating composition comprises an OH/NCO molar ratio in the range of 0.8 to 1.5.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating composition comprises an OH/NCO molar ratio in the range of 0.9 to 1.1.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating layers has a $T_g$ lower than 45° C., for example from −10 to 45° C.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating layers has a pendulum hardness in the range of from 20 to 200 seconds.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating layers has an acid etch resistant temperature in the range of from greater than 80° C.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating layers has a gloss recovery (according to the test described herein) in the range of from 30 to 100 percent; for example, from 30 to 90 percent; or in the alternative from 30 to 75 percent.

In an alternative embodiment, the instant invention provides a coating system, a coating composition, a coating layer, a coated substrate, a method for producing a coating composition, a method for forming a coating layer, a method for making a coated substrate, a method for healing a coating layer, and a method for healing a coated substrate, in accordance with any of the preceding embodiments, except that the coating layers has a gloss retention (according to the test described herein) in the range of from 30 to 100 percent; for example, from 30 to 90; or in the alternative, from 30 to 75 percent.

BRIEF DESCRIPTION OF THE DRAWINGS

For the purpose of illustrating the invention, there is shown in the drawings a form that is exemplary; it being understood, however, that this invention is not limited to the precise arrangements and illustrations shown.

DETAILED DESCRIPTION OF THE INVENTION

Figure 1:
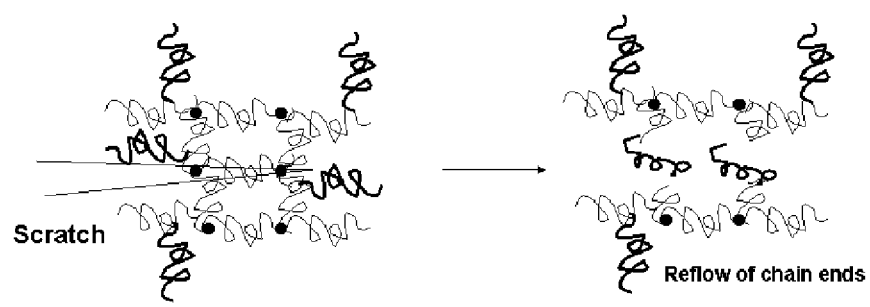
FIG. 1 is a morphology illustration of an inventive coating composition having increased crosslinked density of highly flexible NOP based polymer chain and pendant groups and/or grafting groups providing increased hardness and improved chemical resistance as well as improved scratch and mar resistance.
Figure 2:
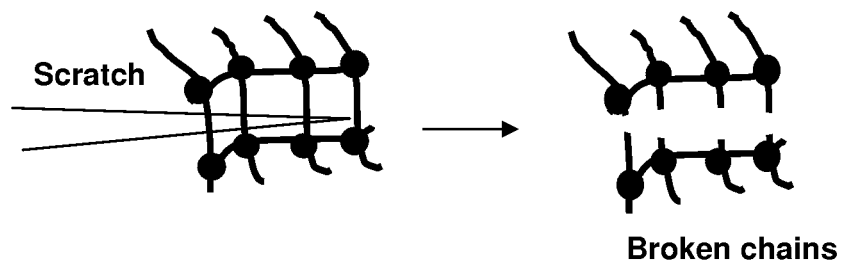
FIG. 2 is a morphology illustration of a conventional coating composition having increased cross-link density, which results in increasing hardness and improved chemical resistance but poor scratch and mar resistance.

The instant invention is a coating system, a coating composition, a coating layer, a coated substrate, a method for producing a coating composition, a method for forming a coating layer, a method for making a coated substrate, and a method for healing a coated substrate.

The coating system according to the present invention comprises: (a) one or more natural oil derived polyols (NOP) having an average of 3 or more hydroxyl groups per molecule, an average molecular weight in the range of 300 to 3000 Daltons, a $T_g$ in the range of from less than 0° C.; and (b) one or more polyisocyanates.

The coating composition according to the present invention is the reaction product of: (a) one or more natural oil derived polyols (NOP) having an average of 3 or more hydroxyl groups per molecule, a molecular weight in the range of 300 to 3000 Daltons, a $T_g$ in the range of from less than 0° C.; and (b) one or more polyisocyanates.

The inventive coating compositions provide excellent hardness/environmental etch resistance while simultaneously yielding superior scratch and mar resistance and/or recovery. This balance of properties is possible because the inventive coating compositions provide a unique balance of features including a) flexibility due to low Tg of the NOP; b) hydrophobicity due to the fatty nature of NOP and c) high crosslink density due to substitution of the NOP with the ideal level of reactive hydroxyl groups.

Natural Oil Derived (Based) Polyols

The natural oil derived (based) polyols are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. The natural product may contain at least about 85 percent by weight unsaturated fatty acids. Examples of preferred vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used.

Several chemistries can be used to prepare the natural oil based polyols. Such modifications of a renewable resource include, but is not limited to, for example, epoxidation, hydroxylation, ozonolysis, esterification, hydroformylation, or alkoxylation. Such modifications are commonly known in the art.

In one embodiment, the natural oil based polyols are obtained by a multi-step process wherein the animal or vegetable oils/fats are subjected to transesterification and the constituent fatty acids esters recovered. This step is followed by reductive hydroformolytions of carbon-carbon double bonds in the constituent fatty acids esters to form hydroxymethyl groups, and then forming a polyester or polyether/polyester by reaction of the hydroxymethylated fatty acid esters with an appropriate initiator compound. Such a multi-step process is commonly known in the art, and is described, for example, in PCT publication Nos. WO 2004/096882 and 2004/096883. The multi-step process results in the production of a polyol with at least a hydrophobic moiety.

The initiator for use in the multi-step process for the production of the natural oil based polyols may be any initiator used in the production of conventional petroleum-based polyols. The initiator may, for example, be selected from the group consisting of 1,3 cyclohexane dimethanol; 1,4 cyclohexane dimethanol; neopentylglycol; 1,2-propylene glycol; trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In the alternative, the initiator may be selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. In another alternative, the initiator is glycerol, trimethylopropane, pentaerythritol, sucrose, sorbitol, and/or mixture thereof.

In one embodiment, the initiators are alkoxylated with ethylene oxide or a mixture of ethylene oxide and at least one other alkylene oxide to give an alkoxylated initiator with a molecular weight between 100 and 500.

The average hydroxyl functionality of the at least one natural oil based polyol, is in the range of from greater than 3 to 10; for example, in the range of from 3.5 to 9; or in the alternative, in the range of from 3.5 to 8; or in the alternative, in the range of from 3.5 to 7; or in the alternative, in the range of from 3.5 to 6; or in the alternative, in the range of from 3.5 to 5.5; or in the alternative, in the range of from 3.5 to 4.5. The average hydroxyl number of the at least one natural oil based polyol is below about 400 mg KOH/g, preferably between about 100 and about 400, more preferably between about 150 and about 300. In one embodiment, the average hydroxyl number is below about 250.

The level of renewable feedstock in the natural oil based polyol can vary between about 10 and about 100 percent, usually between about 20 and about 90 percent.

The natural oil based polyols may constitute up to 100 weight percent of a polyol blend. However, in one embodiment, the natural oil based polyol may constitute at least 5 weight percent, at least 10 weight percent, at least 25 weight percent, at least 35 weight percent, at least 40 weight percent, at least 50 weight percent, or at least 55 weight percent of the total weight of the polyol blend. The natural oil based polyols may constitute 40 percent or more, 50 weight percent or more, 60 weight percent or more, 75 weight percent or more, 85 weight percent or more, 90 weight percent or more, or 95 weight percent or more of the total weight of the combined polyols. Combination of two types or more of natural oil based polyols may also be used.

The viscosity measured at 25° C. of the natural oil based polyols is generally less than about 50,000 mPa·s; for example, the viscosity measured at 25° C. of the natural oil based polyols is less than about 30,000 mPa·s; or in the alternative, the viscosity measured at 25° C. of the natural oil based polyols is less than about 25,000 mPa·s; or in the alternative, the viscosity measured at 25° C. of the natural oil based polyols is less than about 15,000 mPa·s; or in the alternative, the viscosity measured at 25° C. of the natural oil based polyols is less than about 10,000 mPa·s; or in the alternative, the viscosity measured at 25° C. of the natural oil based polyols is less than about 5,000 mPa·s; or in the alternative, the viscosity measured at 25° C. of the natural oil based polyols is less than about 3000 mPa·s.

The natural oil based polyol may have a number average molecular weight in the range of from 300 to 3000 Daltons; for example, from 500 to 2000 Daltons; or in the alternative, from 500 to 1500 Daltons; or in the alternative, from 800 to 1500 Daltons.

NOP may be a blend with any of the following: aliphatic and aromatic polyester polyols including caprolactone based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols.

The natural oil based polyols may have a glass transition temperature ($T_g$) in the range of from less than 0° C.; for example, from less than −20° C.; or in the alternative, from less than −35° C.; or in the alternative, from less than −50° C.; or in the alternative, from less than −55° C.; or in the alternative, from less than −60° C.; or in the alternative, from less than −65° C. In one embodiment, the natural oil based polyols may have a glass transition temperature ($T_g$) in the range of from −70° C. to −35° C.

The flexibility of the polymer chains is influenced by the Tg of NOP polyols used in formulation. The flexibility facilitates for high mobility of the segments between crosslinks in the coating, which may facilitate superior scratch and mar recovery.

The natural oil based polyols typically posses hydrophobic properties. The hydrophobicity of the backbone of the polyol is important to the intrinsic environmental etch resistance of the coating. The inventive NOP compositions are saturated hydrocarbon polymer chains that prevent incursion of aqueous media. Therefore, the inventive NOP based coatings provide superior acid etch resistance, water resistance and excellent weatherbility.

The natural oil based polyols has an average of 3 or more hydroxyl groups per molecule; for example, the natural oil based polyols has an average of 3 to 10 hydroxyl groups per molecule; or in the alternative, the natural oil based polyols has an average of 3 to 9 hydroxyl groups per molecule; or in the alternative, the natural oil based polyols has an average of 3 to 6 hydroxyl groups per molecule; or in the alternative, the natural oil based polyols has an average of 3 to 5 hydroxyl groups per molecule; or in the alternative, the natural oil based polyols has an average of 3 to 4 hydroxyl groups per molecule; or in the alternative, the natural oil based polyols has an average of 4 to 10 hydroxyl groups per molecule; or in the alternative, the natural oil based polyols has an average of 4 to 9 hydroxyl groups per molecule; or in the alternative, the natural oil based polyols has an average of 4 to 8 hydroxyl groups per molecule; or in the alternative, the natural oil based polyols has an average of 4 to 7 hydroxyl groups per molecule; or in the alternative, the natural oil based polyols has an average of 4 to 6 hydroxyl groups per molecule; or in the alternative, the natural oil based polyols has an average of 3 to 10 hydroxyl groups per molecule; or in the alternative, the natural oil based polyols has an average of 3 to 10 hydroxyl groups per molecule.

The number of hydroxyl groups per molecule of polyol is important because such hydroxyl groups provide one or more sites for crosslinking. The highly crosslinked coating derived from flexible, hydrophobic NOP polyols may possess a quick elastic recovery (self-healing). Due to the flexible nature of NOP based coating, the soft NOP segments may store energy and may facilitate the recovery of the coating after one or more insults.

The natural oil based monomers as the raw material for NOP typically comprises (1) from 0.01 to 2 percent by weight of fatty acid esters without hydroxy groups, also know as saturates, (2) from 1 to 90 percent by weight of fatty acid esters containing mono-hydroxy groups; (3) from 5 to 95 percent by weight of fatty acid esters containing di-hydroxy groups; (4) from 0 to 5 percent by weight of fatty acid esters containing plurality-hydroxy groups, wherein the term "plurality" means 3 or more. The natural oil based monomers may be subject to further distillation in order to increase the amount of aliphatic chains containing di-hydroxy groups; for example to an amount in the range of from 30 to 95 weight percent.

The seed oil monomers comprise $CH_3$-A-H, and may be selected from the group consisting of A1, A2 and A3 where, A1 is that fraction of the seed oil monomer with zero hydroxyl groups, A2 is that fraction of the seed oil monomer with at least one hydroxyl group and A3 is that fraction of the seed oil monomer with at least two hydroxyl groups. Other fractions in minority amounts may exist with greater than 3 hydroxyl groups. However, the majority fractions present are:

A1 is

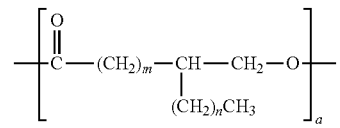

A2 is

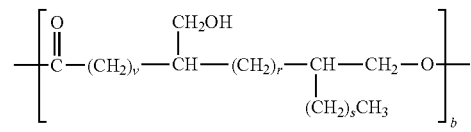

A3 is

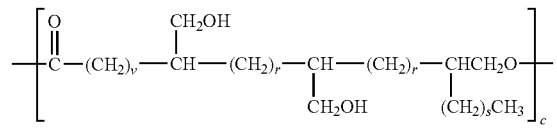

Wherein m, n, v, r, s, a, b, c are integers, and wherein m is between zero and 35, n between 6 and 30, v and r are between zero and 35, s between 6 and 30.

For seed oil monomers a, b, c is 1. However, for natural oil polyols derived from the fatty acid ester monomers, a, b, c may be in the range 1 to 35

The preferred terminal ends of the monomers are alkyl groups defined by n and s and are in the range 6 to 30. For those skilled in the art, such monomers containing primary hydroxyls may also be further reacted partially to terminate some of the hydroxyls into chain ends by other groups such as siloxanes, fluoro, fluoroethers, acrylates, and other alkyl, alkenyl, aryl groups to create additional chain ends. For the purpose of brevity, such chain termination can be achieved by compounds of the general formula $R_tX$ where $R_t$ is from the groups alkyl, alkenyl (e.g. vinyl), aryl (e.g. phenyl) siloxanes, fluoro, fluoro ethers, acrylates and combinations thereof; wherein t is 2-30, and X is a reactive group capable of reacting with one or more hydroxyl groups that is chosen from —COOH groups, glycidyl groups, isocyanates, halides, and the like.

The natural oil based polyols has 2 or more (non-reactive) pendant groups per molecule; for example, the natural oil based polyols has from 3 to 6 pendant groups per molecule; or in the alternative, the natural oil based polyols has from 3 to 5 pendant groups per molecule; or in the alternative, the natural oil based polyols has from 3 to 4 pendant groups per molecule. A pendant group, as used herein, refers to an alkyl functional group that is extended from the backbone of the natural oil based polyol, and does not contain any reactive groups, e.g. one or more hydroxyl groups. The pendant groups are free to associate with each other once the inventive coating is generated; however, the pendent groups are non-reactive. The pendant groups move freely and expand into areas that typically cannot be bridged by broken polymer chains, as further illustrated in FIG. 1. When NOP based coating compositions are crosslinked, the pendant groups retain mobility, and such free mobility may facilitate material flow to the damaged portions of the coating even when the coatings are hard.

Isocyanate:

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis(isocyanatemethyl) isocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, dimers thereof, trimers thereof, tetramers thereof, pentamers thereof, and other higher isomers thereof, and/or combinations thereof.

Solvent

The solvent may be any solvent; for example, the solvent may be an organic solvent. Exemplary solvents include, but are not limited to, acetate based solvents such as butyl acetates, ethyl acetates; ester based solvents such as butyl esters; ketone based solvents such as acetones, methyl ethyl ketone; glycol ether based solvents, aromatic based solvents such as toluene, and the like. Exemplary solvents include, but are not limited to dipropylene glycol dimethyl ether, which is commercially available from The Dow Chemical Company under the tradename PROGLYDE® DMM, and tripropylene glycol dimethyl ether. In one embodiment, the solvent is water or a mixture of water and one or more solvents.

Additional solvents include, but are not limited to, propylene glycol methyl ether acetate, dipropylene glycol methyl ether acetate, propylene glycol diacetate, dipropylene glycol dimethyl ether, diethylene glycol n-butyl ether acetate, ethylene glycol n-butyl ether acetate.

Grafting Functional Group

The coating system may further comprise one or more grafting functional groups. One or more grafting functional groups refer to backbone having hydrophobic functionality, hydrophilic functionality, or combinations thereof, wherein hydrophobic functionality is derived from a functional group selected from the group consisting of alkyl functional group, silane functional group, siloxane functional group, fluoro functional group, fluoro ethers and combinations thereof, and wherein hydrophilic functionality is derived from a functional group selected from the group consisting of alkoxylated functional group, ester functional group, acrylate functional group, and combinations thereof. The grafting function group requires one or more hydroxy groups, provided however, that no more than one hydroxy group is a terminal hydroxy group, so that grafting functional group is capable to react with one or more isocyanate groups. The grafting function group may have any molecular weight depending on the specific grafting functional group; for example, the grafting function group may have a molecular weight in the range of from 100 to 10,000 Daltons, for example, 100 to 5000 Daltons.

For the purpose of brevity, such grafting can be achieved by compounds of the general formula $R_gY$ where $R_g$ is selected from the group consisting of alkyl, alkenyl (e.g. vinyl), aryl (e.g. phenyl) siloxanes, fluoro, fluoro ethers, acrylates and combinations thereof, wherein g is 2-30 and Y is an isocyanate-reactive functional group that include —OH, —SH, —COOH, —NHR with R being hydrogen or an alkyl group.

Preferred siloxane compounds useful in the present invention can be represented by the

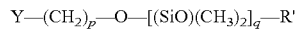

Where Y is as previously defined, p is an integer from 1 to 20, q is an integer from 1 to 100 and R' is an alkyl group.

In one embodiment, the grafting function group requires one or more hydroxy groups, provided however, that no more than two hydroxy group are terminal hydroxy groups, or in the alternative, that no more than one hydroxy group is a terminal hydroxy group, so that grafting functional group is capable to react with one or more isocyanate groups.

In another embodiment, the grafting functional group is

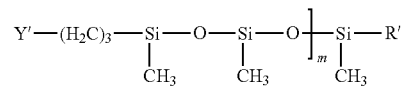

R'—Alkyl group C1-C12
Y'—selected from the group consisting of

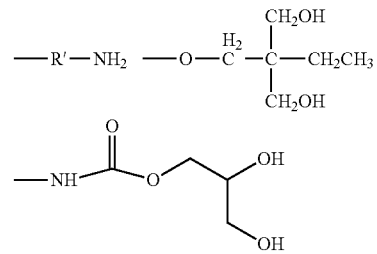

Where m is an integer from 1 to 100.

Other Additional Optional Components

Additional optional components may include, but are not limited to, one or more fillers, one or more catalyst systems, one or more adhesion promoters, one or more flow leveling aids, one or more, one or more pigments, one or more matting agents, and combinations of two or more thereof.

Process for Producing the Inventive Coating Composition:

One or more NOP, as described hereinabove, optionally blended with one or more other polyols, may optionally be dissolved in one or more solvents, and contacted with one or more isocyanates, as described hereinabove, and one or more additional components, as described above, and then intimately admixed to form a uniform composition, thereby producing the inventive coating composition.

In the alternative, one or more NOP, as described hereinabove, one or more grafting functional groups, optionally blended with one or more other polyols, may optionally be dissolved in one or more solvents, and contacted with one or more isocyanates, as described hereinabove, and one or more additional components, as described above, and then intimately admixed to form a uniform composition, thereby producing the inventive coating composition.

End-Use Applications

The coating composition may be formed into a film layer. The film layer may formed on a substrate via any coating method. Such coating methods include, but are not limited to, spraying, dipping, rolling, printing, drawing, brushing, dipping, and any other conventional technique generally known to those skilled in the art. The coating composition may be applied to one or more surfaces of a structure at a temperature in the range of greater than about 5° C.

The coated articles according to the present invention comprise a substrate; and a coating composition associated with one or more surfaces of the substrate, wherein the coating composition is derived from the inventive coating composition, as described hereinabove. The one or more surfaces of the substrate may be treated, e.g. primed or pre-coated with a basecoat, prior to the application of the inventive coating system of the present invention. The substrate may be any substrate; for example, the substrate may comprise a natural or synthetic material. Exemplary substrates include, but are not limited to, wood, concrete, plastic, glass, metal, leather and combinations thereof.

The coating composition of the present invention are film forming compositions. Films derived from the inventive coating composition may have a thickness in the range of from 1 μm to 500 μm; or in the alternative, 1 to 200 μm; or in the alternative, 1 to 100 μm; or in the alternative, 20 μm to 50 μm.

The films, optionally associated with a substrate, derived from the inventive coating composition may have various improved properties such as improved scratch and mar resistance as well as improved scratch and mar recovery, i.e. self-healing properties.

For example, the films, optionally associated with a substrate, derived from the inventive coating composition may have a scratch and mar resistance as measured in terms of gloss retention in the range of greater than 30 percent to less than or equal to 100 percent, measured according to the scratch and mar resistance test described hereinbelow.

For example, the films, optionally associated with a substrate, derived from the inventive coating composition may have a scratch and mar recovery in the range of greater than 30 percent to less than or equal to 100 percent, according to the scratch and mar recovery test described hereinbelow.

For example, the films, optionally associated with a substrate, derived from the inventive coating composition may have an accelerated scratch and mar recovery in the range of greater than 30 percent to less than or equal to 100 percent, according to the scratch recovery test described hereinbelow.

The films, optionally associated with a substrate, derived from the inventive coating composition may further have improved pendulum hardness properties, for example, the films derived from the inventive coating composition may have a pendulum hardness in the range of from 20 seconds to 200 seconds, according to ASTM-D 4366.

The films, optionally associated with a substrate, derived from the inventive coating composition may further have improved solvent resistance properties, for example, the films derived from the inventive coating composition may have solvent resistance by MEK double rubs greater than 100; for example, greater than 200, measured in accordance with ASTM-D 5402.

The films, optionally associated with a substrate, derived from the inventive coating composition may further have improved acid etch resistance properties, for example, the films derived from the inventive coating composition may have acid etch resistance in the range of greater than 40° C., based on rating No. 1; or in the alternative, in the range of greater than 80° C., based on rating No. 4.

End-use applications include, but are not limited to, furniture such as tables, cabinets; building materials such as wood floors, pipes; appliances such as refrigerator handles; automotive exterior parts, and interior parts, and consumer products such as cell-phones, bags, plastic casings.

EXAMPLES

The following examples illustrate the present invention but are not intended to limit the scope of the invention. The examples of the instant invention demonstrate that the inventive polyurethane coating compositions possess adequate hardness and superior scratch and mar resistance while exhibiting self-healing properties.

Synthesis of NOP Polyols

The natural oil polyols (NOPs) were prepared in three reaction steps from the fatty acid methyl esters (FAMES) derived from soy oil. The FAMES are first hydroformylated to the aldehyde intermediates and then hydrogenated in the second step to the soy monomers.

The resulting monomers are then transesterified with a suitable glycol. In this process, polyol molecular weight advances both by condensation of the monomers with the glycol initiator and self condensation of the monomers. By controlling average functionality of the monomers and their ratio to the glycol initiator, both polyol molecular weight and average functionality can be systematically controlled. Furthermore, the structure of the initiator can be adjusted to achieve desired performance characteristics or compatibility. Exemplary initiators may contain reactive primary hydroxyl groups, such as 1,6-hexanediol and UNOXOL™ Diol. UNOXOL™ Diol is a liquid cycloaliphatic diol that is an approximately 50:50 mixture of 1,3-cyclohexanedimethanol and 1,4-cyclohexanedimethanol, which is a mixture cis and trans isomers.

Preparing Inventive and Comparative Coating Compositions:

Coating composition formulation components reported in Table 1 were provided. Catalyst, (dibutyltin dilaurate) and solvents (n-butyl acetate and ethyl 3-ethoxy propionate) were mixed with polyol (was heated in oven at 70-90° C. for at least one hour to melt when necessary) for ten minutes. Subsequently, polyisocyanates (HDI first, and then IPDI) was added, and further mixed for 10 minutes. The formulation was removed from the stir plate, the cap was removed, and the formulation was allowed to de-gas for 5 min before preparing coating.

Coating Panels:

Coatings were prepared on epoxy coated metal panels for most of the testing. Free standing films were also prepared for dynamic mechanical analysis and FTIR analysis. The substrates were placed on drawdown platform. A glass clipboard was used for large panels. A glass plate was placed on a level block for glass slides and taber panels; a glass slide was attached at the bottom of the glass plate to keep the coated substrate from sliding while it was being coated. The coating composition was applied with a plastic transfer pipette at the top of the substrate (applied to middle and lower end as well when coating a large panel to ensure full coverage). A 4.4 mil wire rod bar (#44) was placed at the top of the panel, near the clip, and was pulled slowly down the panel without stopping. Using narrow tipped forceps, the coated panel was removed from the coating platform, and placed on a plate to be put in the oven. The coated substrates were placed directly into a pre-heated 70° C. oven for four hours. After four hours, coated substrates were removed from the oven and cured at room temperature for a minimum of 7 days before testing.

Inventive Example 1

Trimethylol propane (TMP) was used as the initiator with the purified soy monomer to get the polyol (part A) and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Inventive Example 2

1,4-Cyclohexanedimethanol (CHDM) was used as the initiator with the purified soy monomer to get the polyol (part A) and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Comparative Example 1

A commercial auto refinish clear coat with DC5120 polyol (part A) and DH62 (part B).

Comparative Example 2

A commercial acrylic polyol, Joncryl 945, was used as part A and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Comparative Example 3

A commercial polyester polyol, Tone 310, was used as part A and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Comparative Example 4

A commercial dimer diol, pripol 2033, was used as part A and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Comparative Example 5

A 75/25 blend of polyols used in example 4 and the commercial acrylic used in example 5 as part A and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

TABLE 1

| Examples | Polyol (Part A) | NCO:OH | HDI:IPDI (Part B) | Functionality |
|---|---|---|---|---|
| Inventive Example 1 | TMP initiated soy monomer | 1.11:1 | 50.0:50.0 | 8.8 |
| Inventive Example 2 | CHDM initiated soy monomer | 1.10:1 | 50.0:50.0 | 5.5 |
| Inventive Example 3 | UnOXOL initiated soy monomer:acrylic Joncryl 945 :: 0.75:0.25 | 1.16:1 | 50.0:50.0 | 3 |
| Comparative Example 1 | Commercial-DC5120:DH62 = 4:1 parts | | | |
| Comparative Example 2 | Acrylic Joncryl 945 | 1.09:1 | 50.0:50.0 | 3.5 |
| Comparative Example 3 | Polyester-Tone 310 | 1.10:1 | 50.0:50.0 | 3 |
| Comparative Example 4 | Peipol 2033 dimer diol | 1.10:1 | 50.0:50.0 | 3 |

Inventive Examples 1-3 and Comparative Examples 1-4 were tested for their performance attributes, and the results are reported in Table 2.

TABLE 2

| Formulation | DMA Tg (° C.) | Final Gloss Recovery % | Final Gloss Retention % | Pendulum Hardness (König sec) | MEK Double Rubs # Rubs Passed | Acid Etch ° C. for #4 Rating | Acid Etch ° C. for #1 Rating |
|---|---|---|---|---|---|---|---|
| Inventive Example 1 | 23 | 39 | 44.8 | 154 | >200 | 55 | 94 |
| Inventive Example 2 | 18 | 58 | 62.8 | 174 | >200 | 55 | 94 |
| Inventive Example 3 | 25 | 40 | 43.0 | 132 | >200 | 54 | 89 |
| Comparative Example 1 | 30 | 17 | 20.6 | 174 | >200 | 55 | 87 |
| Comparative Example 2 | 37 | 9 | 10.9 | 177 | >200 | 58 | 80 |

TABLE 2-continued

| Formulation | DMA Tg (° C.) | Final Gloss Recovery % | Final Gloss Retention % | Pendulum Hardness (König sec) | MEK Double Rubs # Rubs Passed | Acid Etch ° C. for #4 Rating | Acid Etch ° C. for #1 Rating |
|---|---|---|---|---|---|---|---|
| Comparative Example 3 | 0 | 20 | 94.8 | 41 | >200 | 55 | 80 |
| Comparative Example 4 | 28 | 42 | 53.4 | 76 | >200 | 53 | 99 |

Examples for Self Healing with Water/Steam

Formulation components for inventive Examples 4-5 and Comparative Examples 6-8 are reported in Table 3.

Inventive Example 4

Trimethylol propane (TMP) is used as an initiator with the purified soy monomer to get the polyol (part A) and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Inventive Example 5

Trimethylol propane (TMP) is used as an initiator with the purified soy monomer to get the polyol (part A) and a mixture of isophorone di isocyanate (DPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Inventive Example 6

1,4-Cyclohexanedimethanol (CHDM) is used as an initiator with the purified soy monomer to get the polyol (part A) and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Comparative Example 5

A commercial auto refinish clear coat with DC2042 polyol (part A) and DX61 (part B).

Comparative Example 6

A commercial acrylic polyol, Joncryl 945, as part A and a mixture of isophorone di isocyanate (IDPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

Comparative Example 7

A commercial polyester polyol, Tone 310, as part A and a mixture of isophorone di isocyanate (DPI) and hexamethylene di isocyanate (HDI) as part B. 100 ppm of catalyst (dibutyl tin dilaurate) and a mixture of solvents (n-butyl acetate and ethyl 3-ethoxy propionate) were used to get 65% solids in the final formulation.

TABLE 3

| Examples | Polyol (Part A) | NCO:OH | HDI:IPDI (Part B) | Functionality |
|---|---|---|---|---|
| Inventive Example 4 | TMP initiated soy monomer | 1.11:1 | 50.0:50.0 | 8.8 |
| Inventive Example 5 | TMP initiated soy monomer | 1.11:1 | 50.0:50.0 | 8.7 |
| Inventive Example 6 | CHDM initiated soy monomer | 1.10:1 | 50.0:50.0 | 5.5 |
| Comparative Example 5 | Commercial- DC5120:DH62 = 4:1 parts | — | — | — |
| Comparative Example 6 | Acrylic Joncryl 945 | 1.09:1 | 50.0:50.0 | 3.5 |
| Comparative Example 7 | Polyester- Tone 310 | 1.10:1 | 50.0:50.0 | 3 |

Inventive Examples 4-6 and Comparative Examples 5-7 were tested for their performance attributes, and the results are reported in Table 4. The healing process was further induced via hot water bath.

TABLE 4

| Formulation | DMA Tg (° C.) | Final Gloss Recovery % | Pendulum Hardness (König sec) | MEK Double Rubs # Rubs Passed | Acid Etch ° C. for #4 Rating | Acid Etch ° C. for #1 Rating |
|---|---|---|---|---|---|---|
| Inventive Example 4 | 23 | 82.0 | 154 | >200 | 55 | 94 |
| Inventive Example 5 | 20 | 90.0 | 93 | >200 | 56 | 92 |
| Inventive Example 6 | 18 | 81.0 | 174 | >200 | 55 | 94 |
| Comparative Example 5 | 30 | 27.0 | 174 | >200 | 55 | 87 |

TABLE 4-continued

| Formulation | DMA Tg (° C.) | Final Gloss Recovery % | Pendulum Hardness (König sec) | MEK Double Rubs # Rubs Passed | Acid Etch ° C. for #4 Rating | ° C. for # 1 Rating |
|---|---|---|---|---|---|---|
| Comparative Example 6 | 37 | 1.0 | 177 | >200 | 58 | 80 |
| Comparative Example 7 | 0 | 91.0 | 41 | >200 | 55 | 80 |

Grafted Systems:
Formulation Components for Grafted Systems:

The following formulation components were provided: Natural oil polyol (NOP, Eq. Wt. 165, functionality 3.7), Mono-dicarbinol terminated poly-dimethylsiloxane (PDMS, M.W.: 1000 g/mol) from Gelest Inc., Polyisocyanate trimers: Desmodur N 3600 (HDI) and Desmodur Z 4470BA (IPDI) from Bayer Material Science, Solvent: solvent grade n-butyl acetate (n-BA) and ethyl 3-ethoxypropionate (EEP), Dibutyl-tin dilaurate (DBTDL).

Experimental Procedure for Grafted Systems:

The NCO:OH equivalent ratio was fixed at 1.25:1.0. Appropriate amounts of NOP, PDMS, solvents, and catalyst were measured into a one ounce glass jar with a magnetic stir bar. Solvent was a n-BA and EEP mixture (50:50 wt %), solid content in the formulation was 70%. The solution was mixed at room temperature for 10 minutes. Then HDI trimer and IPDI trimer (50:50 wt %) were added to the mixture. The solution was then mixed for another 10 minutes. The thoroughly mixed solution was removed from the stir plate and allowed to rest for 2-5 minutes to remove most of the gas bubbles in the solution before coatings were cast. Coatings were made on e-coated steel panels by using a 5 mil draw down bar. E-coated panels were pretreated by rinsing with isopropanol and were blown dry with air. The coatings were cured in a box designed to allow air flow while minimizing particle contamination. The wet films were dried under ambient conditions for at least 7 days before testing. Table 5 reports the formulations for the examples.

TABLE 5

| | Non-Grafted Inventive Example 1 | Grafted Inventive Example 1 |
|---|---|---|
| IPDI Trimer | 28 wt % | 28 wt % |
| HDI Trimer | 28 wt % | 28 wt % |
| NOP | 44 wt % | 42 wt % |
| PDMS (MW: 1 kg/mol) | 0 wt % | 2 wt % |
| DBTDL | 0.01 wt % | 0.01 wt % |

Non-grafted inventive Example 1 and grafted Inventive example 1 were tested for their performance attributes, and the results are reported in Table 6.

| | Non-Grafted Inventive Example 1 | Grafted Inventive Example 1 |
|---|---|---|
| Tg (DMA) (° C.) | 44 | 47 |
| Anneal Temperature (° C.) | 55 | 55 |
| Pendulum Hardness (Sec) | 125 | 95 |
| Scratch Recovery (%) | 84 | 90 |

Test Methods

Test methods include the following:

Glass transition temperature: Dynamic mechanical analysis of the coatings was measured using RSA III. The tests were carried out in tension geometry. The films for the test were cast and dried for 7 days before measurement. The films were die cut to a width of 0.5 inches. The thickness of the films was between 0.4-0.6 mm. The dynamic experiments were done at a frequency of 1 Hz with varying % strain from 0.01-0.5% based on temperature. From the tan delta vs. temperature curve, glass transition temperature was taken as the temperature at which tan delta was the maximum.

Abrasion and Gloss measurements: First, the panels were labeled in the upper right hand corner, and then marked on each side approximately 3.2 cm from the edge, to indicate where to place the arrow on the side of the gloss meter. The initial gloss was measured by starting at the top and going clockwise around the panel. (BYK Gardner micro-TRI-gloss meter, Cat #4520; Serial #982069). The readings were recorded at 20° and 60°.

First Cycle:

The panel was abraded for 10 cycles using CS-10F grinding wheels (refaced wheels using ST-11 refacing stone for 25 cycles before abrading panel and after every 100 cycles if doing multiple panels) and 500 g weights, and the dust was removed ith kim wipe and/or air gun. The gloss was then measured by starting at the top and going clockwise around the panel. (BYK Gardner micro-TRI-gloss meter, Cat #4520; Serial #982069). The readings were recorded at 20° and 60°. The panels were annealed at 10° C. above the Tg of the coating (predetermined by DMA analysis of free film). The gloss was measured again by starting at the top and going clockwise around the panel. (BYK Gardner micro-TRI-gloss meter, Cat #4520; Serial #982069). The readings were recorded at 20° and 60°.

Second Cycle:

The panel was abraded for 25 cycles using CS-10F grinding wheels (refaced wheels using ST-11 refacing stone for 25 cycles before abrading panel and after every 100 cycles if doing multiple panels) and 500 g weights, and the dust was removed ith kim wipe and/or air gun. The gloss was then measured by starting at the top and going clockwise around the panel. (BYK Gardner micro-TRI-gloss meter, Cat #4520; Serial #982069). The readings were recorded at 20° and 60°.

The panels were annealed at 10° C. above the Tg of the coating (predetermined by DMA analysis of free film). The gloss was measured again by starting at the top and going clockwise around the panel. (BYK Gardner micro-TRI-gloss meter, Cat #4520; Serial #982069). The readings were recorded at 20° and 60°.

Third Cycle:

The panel was abraded for 100 cycles using CS-10F grinding wheels (refaced wheels using ST-11 refacing stone for 25 cycles before abrading panel and after every 100 cycles if doing multiple panels) and 500 g weights, and the dust was removed ith kim wipe and/or air gun. The gloss was then measured by starting at the top and going clockwise around the panel. (BYK Gardner micro-TRI-gloss meter, Cat #4520; Serial #982069). The readings were recorded at 20° and 60°. The panels were annealed at 10° C. above the Tg of the coating (predetermined by DMA analysis of free film). The gloss was measured again by starting at the top and going clockwise around the panel. (BYK Gardner micro-TRI-gloss meter, Cat #4520; Serial #982069). The readings were recorded at 20° and 60°.

Final High Temp Anneal:

Panels were placed in an oven at 60° C. for one hour. The gloss was then measured by starting at the top and going clockwise around the panel. (BYK Gardner micro-TRI-gloss meter, Cat #4520; Serial #982069). The readings were recorded at 20° and 60°. The panels were placed back in the oven at 90° C. for one hour. The gloss was then measured by starting at the top and going clockwise around the panel. (BYK Gardner micro-TRI-gloss meter, Cat #4520; Serial #982069). The readings were recorded at 20° and 60°.

The healing based on percent gloss recovery was calculated as the (gloss after anneal−gloss after abrasion)*100/initial gloss before abrasion.

The percent gloss retention was calculated as gloss after anneal*100/initial gloss before abrasion.

Scratch and recovery tests of coatings on glass were performed according to the following procedure, and the results are reported in Table 6. A ball indenter (1.6 mm, diameter) was used as the scratch tip. The test was carried out in progressive load mode with load increasing from 0 to 1 kg over a distance of 1 cm on an UMT-2 Tribometer. The velocity used was 6 mm/min. Three scratches were made and a profile of the scratch was collected using a profilometer. The normal force and the shear force during the scratch process were recorded. The coatings were then placed in an oven at 10° C. above the Tg of the coatings for varying time. The recovery of the depth of scratch was noted using a DekTek profilometer and the recovery efficiency noted as (H0−H(t))/H0, where H0 is scratch depth immediately after the scratch and H(t) is scratch depth after annealing for time t. The time t used in this case was 15 minutes.

Pendulum hardness of the coating was measured according to ASTM D4366 by using a Koenig pendulum hardness tester. Solvent resistance was determined by ASTM D5402 using MEK double rubs.

Acid etch resistance of the coating was measured using a gradient oven from BYK-Gardner. The test was run by placing 50 µl drops of a 10% $H_2SO_4$ solution along the length of the panel with 0.25 inches between each pair of drops. The panel was placed in the gradient oven along the heating rods. The oven was programmed for 15 minutes, and after the heating cycle was complete, the panel was rinsed with warm tap water and dried by patting with a paper towel. The temperature of first severe defect [rating #1](where the acid ate through the coating) and temperature at which blushing or yellowing of the coating was seen [rating #4] was recorded. The higher the recorded temperature, the better the acid etch resistance of the coating.

Hot Water Bath Test Method:

60° C. Water Bath

Initial pictures and initial gloss measurements were taken. Panels were marked at 3.2 cm on each side. 50 taber cycles (CS-10F wheels) (Resurface wheels with ST-11 resurfacing stone for 25 cycles after every 100 cycles) were ran. Pictures and gloss reading were taken again. Panels were placed in a pre-heated 60° C. deionized (DI) water bath for 5 minutes. Pictures and gloss readings were taken again. The process was repeated two times.

80° C. Water Bath

Initial pictures and initial gloss measurements were taken. Panels were marked at 3.2 cm on each side. 50 taber cycles (CS-10F wheels) (Resurface wheels with ST-11 resurfacing stone for 25 cycles after every 100 cycles) were ran. Pictures and gloss reading were taken again. Panels were placed in a pre-heated 80° C. deionized (DI) water bath for 5 minutes. Pictures and gloss readings were taken again. The process was repeated two times.

The present invention may be embodied in other forms without departing from the spirit and the essential attributes thereof, and, accordingly, reference should be made to the appended claims, rather than to the foregoing specification, as indicating the scope of the invention.

We claim:

1. A method for healing a coated substrate comprising the steps of:
    selecting a coated substrate comprising:
    a substrate;
    a coating layer associated with said substrate which contains at least one scratch or mar or which has surface damage, wherein said coating layer comprises a film, wherein said film comprises the reaction product of:
    (a) one or more natural oil derived polyols having an average of 3 or more hydroxyl groups per molecule, having 2 or more non-reactive pendant groups per molecule, and a number average molecular weight in the range of 300 to 3000;
    (b) one or more polyisocyanates;
    heat treating said coating layer at a temperature in the range of from 10 to 90° C.; thereby healing said coated substrate.

2. The method according to claim 1, wherein said heat treatment step is achieved via hot water heat treatment or steam.

3. The method according to claim 1, wherein the one or more natural oil derived polyols have from 3 to 6 non-reactive pendant groups per molecule.

4. The method according to claim 1, wherein the heat treating comprises treating the coated layer at a temperature of from 60° C. to 90° C.

* * * * *